United States Patent
Rewaskar et al.

(10) Patent No.: US 9,338,254 B2
(45) Date of Patent: May 10, 2016

(54) SERVICE MIGRATION ACROSS CLUSTER BOUNDARIES

(71) Applicant: Microsoft Corporation, Redmond, WA (US)

(72) Inventors: Sushant Pramod Rewaskar, Redmond, WA (US); Muhammad Umer Azad, Bellevue, WA (US); Saad Syed, Redmond, WA (US); Christopher Paul Almida, Arlington, WA (US); Ajay Mani, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 581 days.

(21) Appl. No.: 13/737,745

(22) Filed: Jan. 9, 2013

(65) Prior Publication Data

US 2014/0195687 A1     Jul. 10, 2014

(51) Int. Cl.
*G06F 15/173* (2006.01)
*H04L 29/08* (2006.01)
*G06F 9/48* (2006.01)
*G06F 9/455* (2006.01)
(Continued)

(52) U.S. Cl.
CPC .............. *H04L 67/34* (2013.01); *G06F 9/4856* (2013.01); *H04L 67/10* (2013.01); *G06F 2009/4557* (2013.01); *H04L 61/1511* (2013.01); *H04L 61/2076* (2013.01); *H04L 67/1002* (2013.01); *H04L 69/40* (2013.01)

(58) Field of Classification Search
CPC ............................. G06F 9/4856; H04L 67/34
USPC .................................. 709/226, 230, 229, 203
See application file for complete search history.

(56) References Cited

U.S. PATENT DOCUMENTS

2009/0276771 A1* 11/2009 Nickolov et al. ............. 717/177
2010/0211548 A1    8/2010 Ott et al.
2010/0287263 A1* 11/2010 Liu et al. ....................... 709/221
(Continued)

FOREIGN PATENT DOCUMENTS

EP           2251783 A1     11/2010

OTHER PUBLICATIONS

"International Search Report & Written Opinion for PCT Patent Application No. PCT/US2014/010571", Mailed Date: Mar. 19, 2014, Filed Date: Jan. 8, 2014, 12 Pages.
(Continued)

*Primary Examiner* — Joseph E Avellino
*Assistant Examiner* — Marshall McLeod
(74) *Attorney, Agent, or Firm* — Ben Tabor; Kate Drakos; Micky Minhas

(57) ABSTRACT

Embodiments provide migration of services across different clusters to balance utilization and meet customer demands. Different service migration options may be performed with or without downtime. The artifacts of the service are moved to a new destination cluster. The service is created on the new destination cluster and staged so that the service is almost ready to start. In one embodiment, the service is stopped on the old cluster and started on the new cluster. After stopping the service, DNS is updated to point to the service on the new cluster. In another embodiment, the service is stopped on the old cluster and started on the new cluster with the same IP address to avoid DNS reprogramming and associated delays. In a further embodiment, the migration is performed without downtime by moving the service part by part from one cluster to another.

15 Claims, 4 Drawing Sheets

(51) Int. Cl.
*H04L 29/14* (2006.01)
*H04L 29/12* (2006.01)

(56) References Cited

U.S. PATENT DOCUMENTS

| | | |
|---|---|---|
| 2011/0099267 A1 | 4/2011 | Suri et al. |
| 2012/0041988 A1 | 2/2012 | Driesen |
| 2012/0054624 A1 | 3/2012 | Owens, Jr. et al. |
| 2012/0117417 A1 | 5/2012 | Graham et al. |
| 2012/0297238 A1* | 11/2012 | Watson et al. ............... 714/4.11 |

OTHER PUBLICATIONS

Elmore, Aaron J. et al., "Zephyr: Live Migration in Shared Nothing Databases for Elastic Cloud Platforms," Proceeding on International Conference on Management of Data, SIGMOD'11, Jun. 12-16, 2011, (12 Pages), Athens, Greece.

Microsoft, "Server Virtualization: Windows Server 2012," White Paper on Windows Server, Retrieved Date: Oct. 31, 2012, (77 pages).

EMC Corporation, "Oracle Real Application Clusters (RAC) on Extended Distance Clusters with EMC VPLEX Metro," White Paper, 2012, (40 pages).

* cited by examiner

SERVICE MIGRATION ACROSS CLUSTER BOUNDARIES

BACKGROUND

Large scale data centers typically comprise organized clusters of hardware machines running collections of standard software packages, such as web servers, database servers, and the like. For fault tolerance and management reasons, the machines in a datacenter are typically divided into multiple clusters that are independently monitored and managed by a framework that coordinates resources for software applications. In one embodiment, the framework may be a Windows Azure™ Fabric Controller, for example, that provisions, supports, monitors, and commands virtual machines (VMs) and physical servers that make up the datacenter.

In existing datacenters, each tenant is deployed to a single cluster for its entire lifecycle, which allows the tenants' deployment to be managed by a single framework. This configuration may limit the tenant's growth, however, as expansion is limited to the machines within the single cluster. The tight coupling between tenants and clusters requires datacenter operators to maintain the capacity for a cluster at a level that will satisfy the potential future requirements for the tenants deployed on that cluster. Often, this results in the clusters operating at a low current utilization rate in anticipation of possible future needs. Even when excess capacity is maintained, this only improves the likelihood that a tenant's future needs will be supported. There is no guarantee that a tenant scale request will be limited to the reserved capacity and, therefore, at times a tenant may be unable to obtain the required capacity.

Limiting a service to one cluster also creates a single point of failure for that service. If the framework controlling that cluster fails, then the entire cluster will fail and all services supported on the cluster will be unavailable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention allow a tenant's service to move among multiple clusters either with or without downtime. A service is associated with a particular IP address on a cluster. Users access the service using a domain name that is translated to the IP address by a domain name system (DNS) or other network location service. The service's IP address might or might not be changed when the service is moved among clusters.

A service may be migrated with downtime by staging a new instance of the service in a new cluster, waiting for the new instance to be ready, then stopping the original instance, and pointing the DNS name of the service to IP address corresponding to the new deployment of the service on the new cluster.

Alternatively, the service may be migrated to the new cluster with downtime and may keep an original IP address. This would avoid the need for reprogramming DNS and the associated delays while the DNS caches are repopulated.

A further alternative for migrating the service is to perform the migration without downtime by moving the service part by part such that the service is always running in either or both of the clusters throughout the migration.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
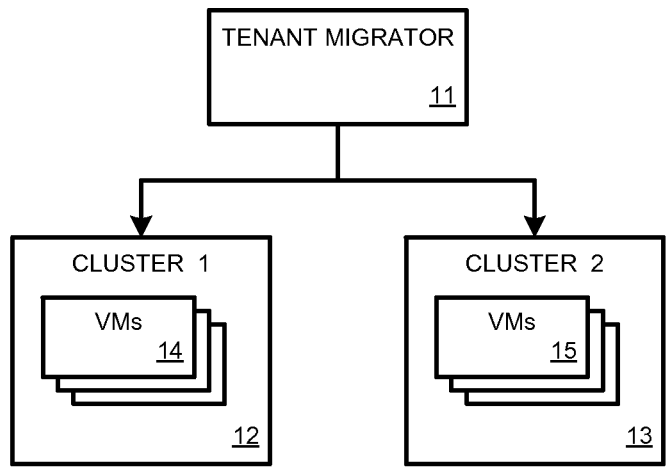
FIG. 1 is a block diagram illustrating a tenant migrator that is used to move services across different clusters.

FIG. 1 is a block diagram illustrating a tenant migrator 11 that is used to move services across different clusters 12, 13. The tenant migrator 11 connects to all clusters in a datacenter. Once a datacenter operator decides to move a service between clusters, for example, to balance utilization or to meet tenant demands, the tenant migrator 11 identifies the right destination cluster for the service. Selection of the destination cluster may be based on factors such as utilization of the potential destination clusters, current demands made by the service, etc. Once a destination cluster is identified, tenant migrator 11 moves the services by creating/deleting instances on VMs 14, 15 on the original and new cluster.

The tenant migrator 11 controls whether the migration is performed with or without downtime as selected by the operator. The tenant migrator 11 may request an update to DNS records if a new IP address is assigned to a service, or it may move an IP address to new cluster if the service is maintaining the same address. The service presence is mutually exclusive during migration. For example, when a service is migrated, tenant migrator 11 ensures that two instances of the service are never both running from the customer perspective.

Figure 2:
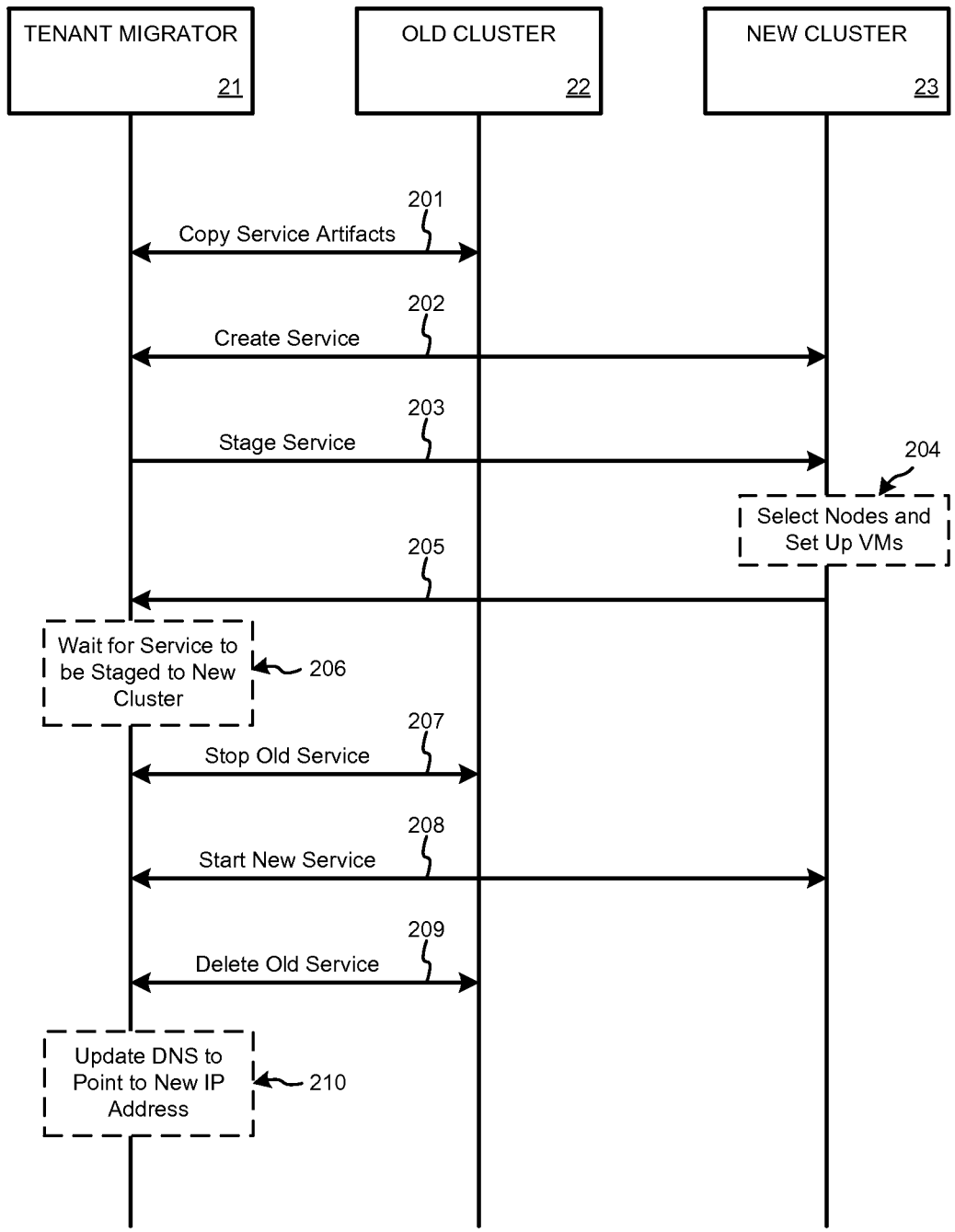
FIG. 2 is illustrates a service migration that has service downtime and requires DNS reprogramming.

FIG. 2 is illustrates a service migration that has service downtime and requires DNS reprogramming according to one embodiment. Tenant migrator 21 has identified a service running on cluster 22 that is to be moved to cluster 23. The old service is assigned an old IP address on cluster 22. In step 201, tenant migrator 21 identifies and copies service artifacts, such as code, bits, certificates, models, etc. from cluster 22. Using these artifacts, a new service is created in step 202 on cluster 23 but the service is not started.

Tenant migrator 21 directs the new cluster 23 to stage the new service in step 203. Cluster 23 selects the appropriate nodes and sets up the VMs to run the service in step 204. A new IP address on cluster 23 is assigned to the new service. Cluster 23 does not start the service at this point. The tenant migrator 21 waits in step 206 for the service to be staged on the new cluster, which is indicated, for example, in step 205.

Once the new service has been staged, tenant migrator 21 stops the old service in step 207, and then starts the new service in step 208. The old service is deleted from cluster 22 in step 209, which opens room for other services running on that cluster to expand or to be added.

The tenant migrator then updates the central DNS record in step 210 so that the domain name for the service points to the appropriate new IP address on cluster 23. The DNS record updates may be performed simultaneously with steps 207 and 208 while the old service is stopped and the new service is started.

There is a period between stopping the old service in step 207 and starting the new service in step 208 when the service will not be available to users. Additionally, if users access the service using the domain name, then there may be additional delay while the DNS records are updated from the old IP address to the new IP address for the service's domain name. Because DNS supports many local caches distributed across the Internet, time is required to update all of these caches. Once the central DNS records are updated, then local DNS caches are cleared and updated with the new IP address. Until these updates occur, users will be directed to the old cluster 22 which is no longer running the service and, therefore, attempts to use the service will fail.

Figure 3:
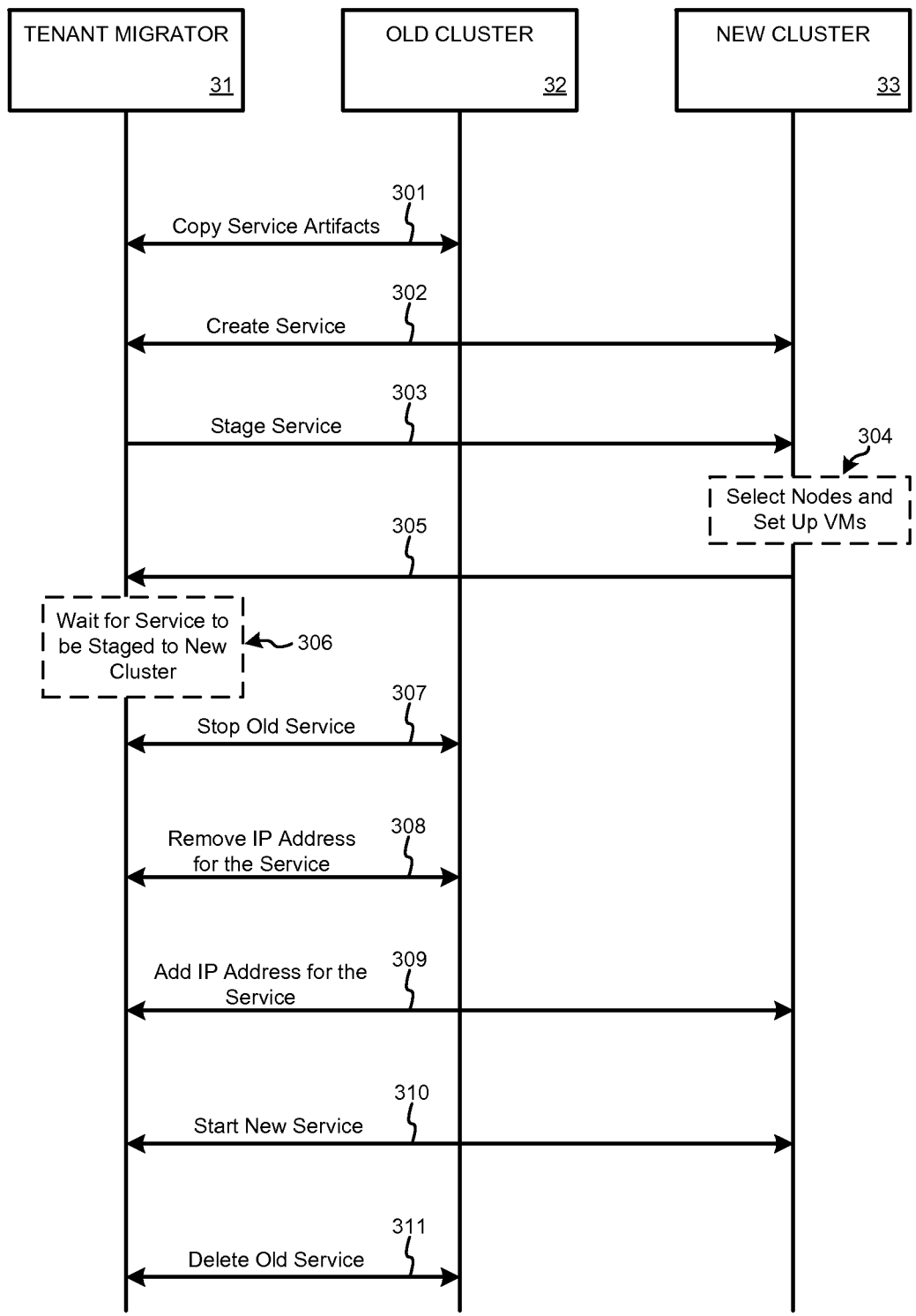
FIG. 3 is illustrates a service migration that has service downtime but that preserves the service's IP address.

FIG. 3 is illustrates a service migration that has service downtime but that preserves the service's IP address according to one embodiment. Tenant migrator 31 has identified a service running on cluster 32 that is to be moved to cluster 33. The old service is assigned an IP address on cluster 32. In step 301, tenant migrator 31 identifies and copies service artifacts, such as code, bits, certificates, models, etc. from cluster 32. Using these artifacts, a new service is created in step 302 on cluster 33 but the service is not started.

Tenant migrator 31 directs the new cluster 33 to stage the new service in step 303. Cluster 33 selects the appropriate nodes and sets up the VMs to run the service in step 304. Cluster 33 does not start the service at this point. The tenant migrator 31 waits in step 306 for the service to be staged on the new cluster, which is indicated, for example, in step 305.

Once the new service has been staged, tenant migrator 31 stops the old service in step 307. In step 308, the IP address for the service is removed from cluster 32.

The IP address for the service is added to cluster 33 in step 309, and the new service on cluster 33 is started in step 310.

Finally, the old service is deleted from cluster 32 in step 311, which opens room for other services running on that cluster to expand or to be added.

Because the IP address for the service has not changed, the tenant migrator does not need to update the DNS records as was required in the process illustrated in FIG. 2. Accordingly, there is a period between stopping the old service in step 307 and starting the new service in step 310 when the service will not be available to users. However, once the new service is started, users may still access the service using the domain name without waiting for any DNS record update delay. Local DNS caches will be accurate because the domain name for the service will still be associated with the same IP address for the service.

Figure 4:
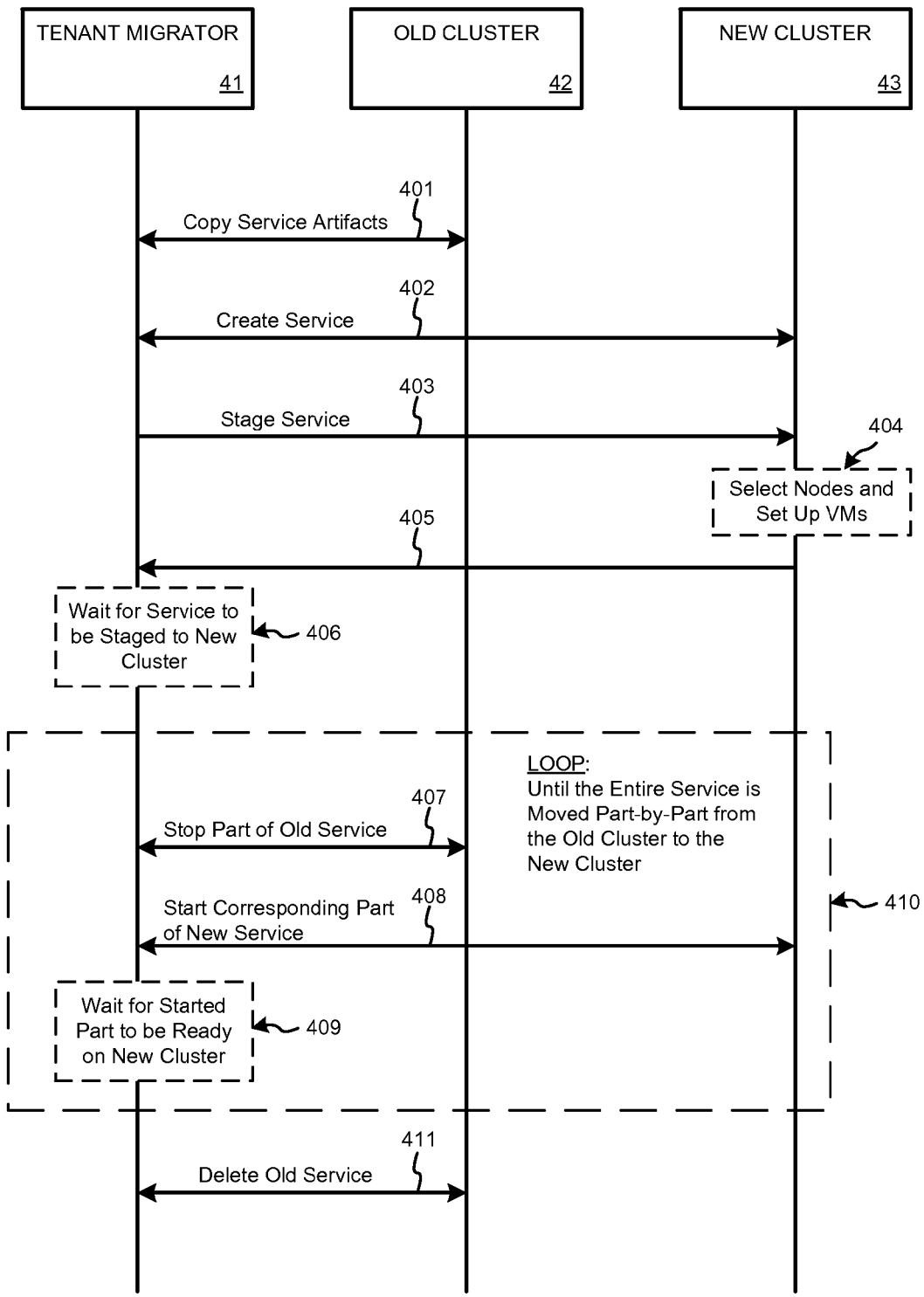
FIG. 4 is illustrates a service migration that eliminates the service downtime and preserves the service's IP address.

FIG. 4 is illustrates a service migration that eliminates the service downtime and preserves the service's IP address according to one embodiment. Tenant migrator 41 has identified a service running on cluster 42 that is to be moved to cluster 43. The old service is assigned an old IP address on cluster 42. In step 401, tenant migrator 41 identifies and copies service artifacts, such as code, bits, certificates, models, etc. from cluster 42. Using these artifacts, a new service is created in step 402 on cluster 43 but the service is not started.

Tenant migrator 41 directs the new cluster 43 to stage the new service in step 403. Cluster 43 selects the appropriate nodes and sets up the VMs to run the service in step 404. The same IP address is used on both cluster 42 and cluster 43 for the service. The tenant migrator 41 waits in step 406 for the service to be staged on the new cluster, which is indicated, for example, in step 405.

Once the new service has been staged, tenant migrator 41 stops part of the old service in step 407. Tenant migrator 41 then starts the corresponding part of the new service in step 408. The network is also updated as necessary in step 408 to connect the started parts of the old and new service as well as the load balancers and other routing components to allow them to point to the started service across clusters 42, 43. Unlike the processes illustrated in FIGS. 2 and 3, only a portion of the service (e.g., a selected number of VM or instances) is stopped in step 407 and then started in step 408. Tenant migrator waits in step 409 for the part that was started on the new cluster to be ready for use.

Once the new part is ready in step 409, then the tenant migrator repeats (410) steps 407-409 for a next part of the service. These steps continue in a loop 410 until all of the service has been moved piecemeal from old cluster 42 to new cluster 43. In one embodiment, one update domain worth of service is moved at a time during each pass through loop 410. The tenant would be ready to lose the upgrade domain during upgrades to the service, so those segments can be used to portion the service for the inter-cluster migration.

After all of the parts of the service have been moved in loop 410, the old service is deleted from cluster 42 in step 411.

Because the IP address for the service has not changed, the tenant migrator does not need to update the DNS records as was done in the process illustrated in FIG. 2. There is no period during which the service is stopped on both clusters. Accordingly, the service will always be available to users without downtime.

Figure 5:
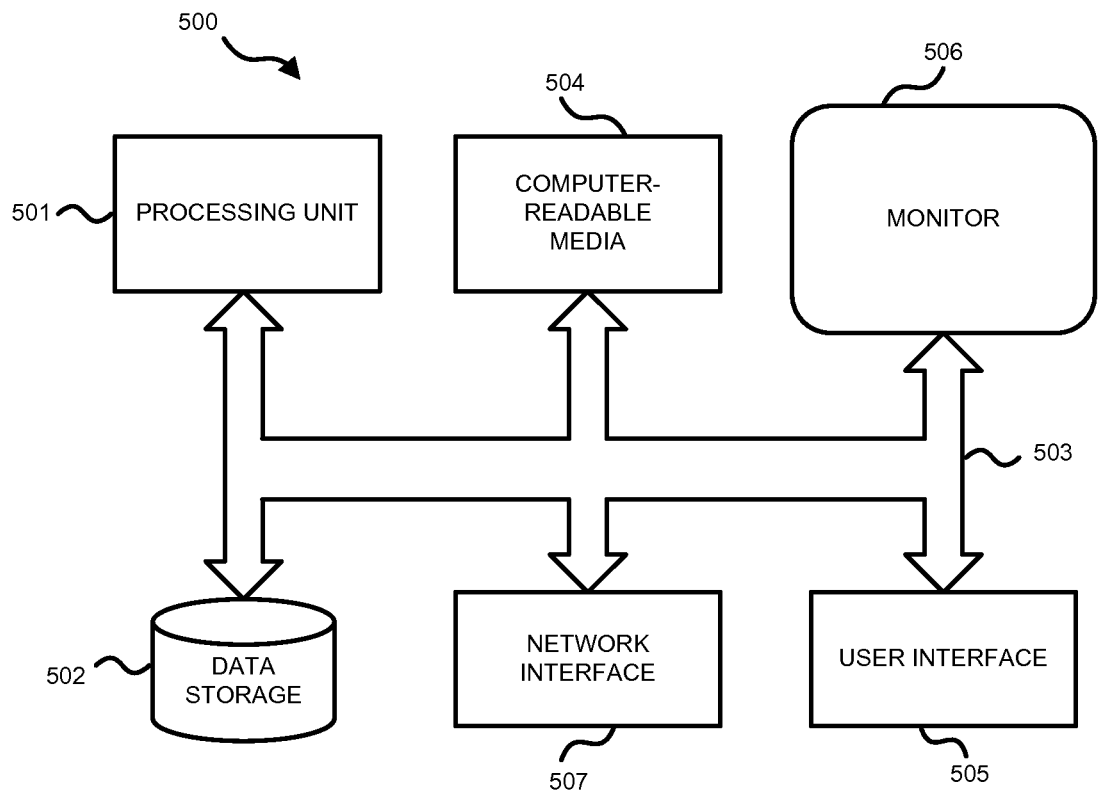
FIG. 5 illustrates an example of a suitable computing and networking environment for tenant migration.

FIG. 5 illustrates an example of a suitable computing and networking environment on which the examples of FIGS. 1-4 may be implemented. For example, the tenant migrator 11 and/or VMs 14, 15 may be hosted on one or more computing systems 500. The computing system environment 500 is only one example of a suitable computing environment and is not intended to suggest any limitation as to the scope of use or functionality of the invention. A plurality of such computing systems 500 may be grouped to support clusters 11, 12 in a datacenter, for example. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:

copying artifacts from a first instance of a service running on a first cluster in a computing environment on a network, the first cluster comprising a first group of virtual machines to run the first instance of the service, the first instance of the service comprising a first plurality of parts in a running state and being associated with an IP address;

creating a second instance of the service on a second cluster in the computing environment on the network by selecting one or more nodes on the second cluster and configuring a second group of virtual machines to run the second instance of the service thereon using the artifacts copied from the first instance of the service, the second instance of the service comprising a second plurality of parts in a non-running state, each of the second plurality of parts corresponding to one of the first plurality of parts and also being associated with the IP address;

stopping, on the first instance of the service on the first cluster, a first part from the first plurality of parts so that the first part from the first plurality of parts is in the non-running state;

starting, on the second instance of the service on the second cluster, a corresponding part from the second plurality of parts so that the corresponding part from the second plurality of parts is in the running state;

updating the network to provide access to only the parts from the first and second plurality of parts that are in the running state;

performing the stopping, starting, and updating steps two or more times until all parts from the first plurality of parts is in the non-running state and all corresponding parts from the second plurality of parts is in the running state; and deleting the first instance of the service on the first cluster.

2. The method of claim 1, further comprising:

assigning an IP address to the first and second instance of the service; and supporting the service simultaneously on both the first cluster and the second cluster using the IP address.

3. The method of claim 1, further comprising:

after creating the second instance of the service on the second cluster, staging the second instance of the service so that the second instance of the service is ready to be in the running state on the second cluster but is not in the running state.

4. The method of claim 1, wherein the copied artifacts comprise one or more of code, certificates, and models.

5. The method of claim 1, wherein a tenant migrator manages stopping the first part and starting the corresponding part.

6. The method of claim 1, wherein the first cluster and second cluster are located within a datacenter.

7. A computer program product for implementing a method for migrating services from a first cluster to a second cluster within a datacenter, the computer program product comprising one or more non-transitory computer-readable storage media having stored thereon computer-executable instructions that, when executed by one or more processors of a computing system, cause the computing system to perform the method comprising:

copying artifacts for a first instance of a service on the first cluster;

creating a second instance of the service on the second cluster;

stopping a selected part from a first plurality of parts of the first instance of the service on the first cluster;

starting a corresponding part from a second plurality of parts of the second instance of the service on the second cluster; and deleting the first instance of the service on the first cluster.

8. The computer program product of claim 7, wherein creating the second instance of the service on the second cluster includes using the copied artifacts for the first instance of the service on the first cluster.

9. The computer program product of claim 7, wherein each of the first plurality of parts of the first instance of the service on the first cluster is started, and wherein each of the second plurality of parts of the second instance of the service on the second cluster is stopped.

10. The computer program product of claim 7, further comprising:

performing the stopping and starting steps two or more times until all selected parts of the first instance of the service have been stopped on the first cluster and all corresponding parts of the second instance of the service have been started on the second cluster.

11. The computer program product of claim 7, further comprising:

assigning an IP address to the first instance of a service on the first cluster and further assigning the IP address to the second instance of the service on the second cluster; and supporting the first instance of the service and the second instance of the service simultaneously on both the first cluster and the second cluster using the IP address.

12. The computer program product of claim 11, wherein supporting the first instance of the service and the second instance of the service simultaneously on both the first cluster and the second cluster using the IP address further includes updating the network, load balancers, and/or other routing components to point the IP address to the started selected parts from the first plurality of parts and the started corresponding parts from the second plurality of parts.

13. A system having a processor, and memory with computer-executable instructions embodied thereon that, when executed by the processor, performs a method for migrating services from a first cluster to a second cluster within a datacenter on a network, the system comprising:

a first cluster in a datacenter comprising a first group of virtual machines configured to run a first instance of a service, the first instance of the service configured to include a first plurality of parts in a running state and further configured for associating with an IP address;

a second cluster in the datacenter comprising a plurality of virtual machines;

a tenant migrator configured to:

identify the first instance of the service in the first cluster in the datacenter for moving to the second cluster in the datacenter;

copy artifacts associated with the service from the first cluster to the second cluster;

create a second instance of the service on the second cluster by selecting one or more nodes on the second cluster;

configure a second group of virtual machines configured to run the second instance of the service, the second instance of the service configured to include a second plurality of parts in a non-running state and further configured for associating with the IP address;

stop, on the first instance of the service on the first cluster, a first part from the first plurality of parts so that the first part from the first plurality of parts is in the non-running state;

start, on the second instance of the service on the second cluster, a corresponding part from the second plurality of parts so that the corresponding part from the second plurality of parts is in the running state;

update the network to provide access to only the parts from the first and second plurality of parts that are in the running state;

perform the stop and start steps two or more times until all parts of the first plurality of parts is in the non-running state and all corresponding parts of the second plurality of parts is in the running state; and delete the first instance of the service on the first cluster.

14. The system of claim 13, the tenant migrator further configured to:

stage the second instance of the service so that the second instance of the service is configured to be changed to the running state on the second cluster but is not in the running state.

15. The system of claim 13, wherein the artifacts associated with the service comprise one or more of code, certificates, and models.

* * * * *